United States Patent
Spada

[19]

[11] Patent Number: 5,810,152
[45] Date of Patent: Sep. 22, 1998

[54] CONVEYOR DEVICE WITH A CIRCULAR PATH

[75] Inventor: Valter Spada, Marzabotto, Italy

[73] Assignee: SASIB S.p.A., Bologna, Italy

[21] Appl. No.: 601,519

[22] Filed: Feb. 14, 1996

[30] Foreign Application Priority Data

Feb. 15, 1995 [IT] Italy .................................. GE95A0015

[51] Int. Cl.[6] .................................................. B65G 29/00
[52] U.S. Cl. .................................... 198/478.1; 198/482.1; 198/483.1
[58] Field of Search .................... 198/803.14, 803.16, 198/482.1, 478.1, 479.1, 483.1, 469.1; 53/234; 131/282, 283, 285; 74/70

[56] References Cited

U.S. PATENT DOCUMENTS

| | | | |
|---|---|---|---|
| 3,687,285 | 8/1972 | Messervey | 198/482.1 X |
| 3,757,927 | 9/1973 | Gable et al. | 198/478.1 X |
| 3,780,848 | 12/1973 | Studeny | 198/478.1 X |
| 4,352,265 | 10/1982 | Hanel et al. | |
| 4,519,180 | 5/1985 | Maure | 198/483.1 X |
| 4,823,536 | 4/1989 | Manservigi et al. | 198/482.1 X |

FOREIGN PATENT DOCUMENTS

| | | | |
|---|---|---|---|
| 1315224 | 6/1987 | U.S.S.R. | 198/478.1 |
| 2019803 | 11/1979 | United Kingdom . | |

*Primary Examiner*—Frank E. Werner
*Attorney, Agent, or Firm*—Larson & Taylor

[57] ABSTRACT

A conveyor device with a circular path, particularly for groups of fragile cylindrical objects and for use in cigarette packing machines, includes a wheel (1, 1') made to rotate about its axis and preferably in steps of predetermined angular size. The wheel is provided with a plurality of peripheral cells (101) which are open or openable at one end at least, in particular on one and/or both sides and/or at the outer perimeter of the wheel, to house groups of cylindrical objects. The wheel is divided into two parts (1, 1') physically separated along an intermediate plane perpendicular to the axis of the wheel, the two parts (1, 1') being mounted rotatably coaxially with each other and being driven in phase and in synchronization with each other.

16 Claims, 6 Drawing Sheets

CONVEYOR DEVICE WITH A CIRCULAR PATH

BACKGROUND OF THE INVENTION

The invention relates to a conveyor device with a circular path, particularly for groups of fragile cylindrical objects and for use in cigarette packing machines, this device comprising a wheel rotated about its axis and preferably in steps of predetermined angular size, this wheel being provided with a plurality of peripheral cells which are open or openable on at least one side, particularly on one and/or both the sides and/or on the outer peripheral edge of the wheel.

DESCRIPTION OF THE PRIOR ART

In particular, in cigarette packing machines, the ordered groups of cigarettes are wrapped in successive phases in the different layers of packaging which form the finished pack. The different operating units for the wrapping of the individual layers of packaging which form the packs are divided into stations which are distributed along a circular path and the ordered groups of cigarettes are transferred from one station to the next by means of conveyors in the form of wheels with cells of the type described initially which are driven in steps. To increase the efficiency of packing machines, the conveyor wheels have to be driven at very high speeds. The stepping drive therefore requires continual accelerations and decelerations which are of considerable size when very high mean speeds are required, in other words when a high number of finished packs per unit of time is required. In these conditions, therefore, in order not to have to provide excessively large motors and transmissions, and in order to obtain the considerable precision of the steps of advance required, it becomes necessary to reduce to a minimum the inertial mass of the conveyor wheel. Moreover, since: the driving means and the means of transmission of the motion must also be accelerated and decelerated, it is appropriate to provide for a reduction of the moving inertial masses of these means.

SUMMARY OF THE INVENTION

The object of the invention, therefore, is to provide a conveyor device of the type described initially, which, by relatively simple arrangements, enables a considerable reduction of the moving masses to be obtained in order to reach higher operating speeds, while ensuring the maximum precision of the steps of advance and a considerable reduction of the intrinsic inertia of the driving and transmission means, without the need to make these means excessively large.

The invention achieves the above objects with a conveyor device of the type described initially, in which the wheel is divided into two parts which are physically separate from each other along an intermediate plane perpendicular to the axis of the wheel, the two parts being mounted so that they are rotatable coaxially with each other.

In a first embodiment, the two parts of the wheel may be connected together dynamically and driven by a common motor.

In a variant embodiment, the two parts of the wheel are driven by motors which are independent of each other and means of synchronizing the steps of rotation of the parts are provided to prevent any angular misalignment.

The wheel may advantageously consist of two parallel discs, each of which is mounted on a coaxial bush, the cells to support the cylindrical objects consisting of cradles, for example peripheral recesses of suitable section which are formed on or in the discs and are identical for both discs and axially aligned with each other.

In this case, the two discs are spaced apart by an amount slightly less than the length of the cigarettes, while the support cradles form the marginal areas of the cells for the groups of cigarettes. Each disc is mounted on one projecting end of an axle, the two disc support axles being disposed coaxially and with the facing disc support ends spaced apart substantially by an amount corresponding to the axial spacing of the two discs, while a completely free space is formed between the two discs and the two axles.

One or more radial guide and/or pushing units are advantageously interposed in the area of the free space between the two axles, for the transfer and/or expulsion of the groups of cigarettes into and from the cells.

According to a further characteristic, each of the two discs is associated with means for the transmission of the continuous rotary motion of a motor and its conversion into an alternating stepping motion, these means consisting of a Maltese cross for each disc which is connected dynamically to the disc so that it rotates coaxially with it.

To ensure correct synchronization and phasing, and precision of the steps of advance, each Maltese cross advantageously interacts simultaneously with two contra-rotating check drums.

Each disc forming the conveyor wheel has a mass substantially equal to half of the overall mass. This makes it possible to use means of transmission and conversion of the continuous motion into a stepping motion which have considerably smaller inertial masses. This considerably reduces the overall resistant torque of the system without incurring problems of instability of motion. Moreover, this arrangement makes it possible to limit the size of the motors, and even to provide separate motors for the two independent parts of the wheel. The drastic reduction in resistant torque and the particular construction of the means of transmission and conversion of the motion with a fixed law make it possible to provide synchronizing means which may be electronic, since the precision of the steps of advance is ensured. The construction of the conveyor wheel in two separate parts also has the further advantage of making it possible to provide, very easily, radial means for the accompaniment of the groups of cigarettes when they are fed into the conveyor wheel, and pushing means to expel the cigarettes from the conveyor wheel. In particular, as there are no axial elements connecting the two parts of the wheel, the means of driving the said guide and pushing means are considerably simplified, since the periods for the execution of the forward and return movement of these means are longer because it is not necessary to allow for any interference with axial connecting means. A further advantage may consist in the fact that it is possible to considerably limit the movement of the said guide pushing means, since the rest position may be disposed directly radially inward from the corresponding sides of the cells.

The invention also relates to other characteristics which further improve the device described above and which form the subject of the dependent claims.

BRIEF DESCRIPTION OF THE DRAWINGS

The particular characteristics of the invention, and the advantages derived therefrom, will be more clearly understood from the following description of a preferred embodiment of the invention, illustrated by way of example and without restriction in the attached drawings, in which.

DESCRIPTION OF THE PREFERRED EMBODIMENT

Figure 1:
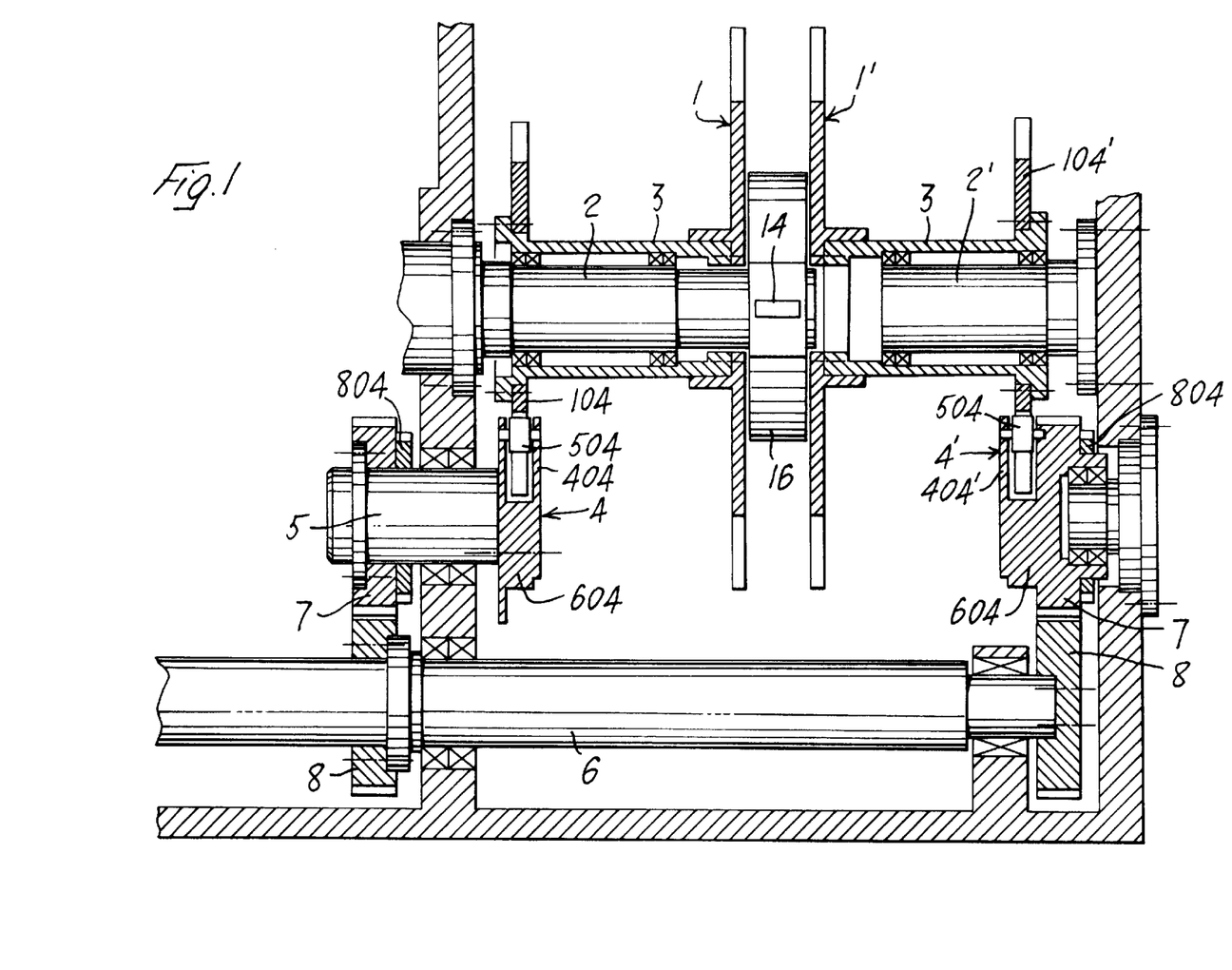
FIG. 1 shows a section through an axial plane of the conveyor device according to the invention.
Figure 2:
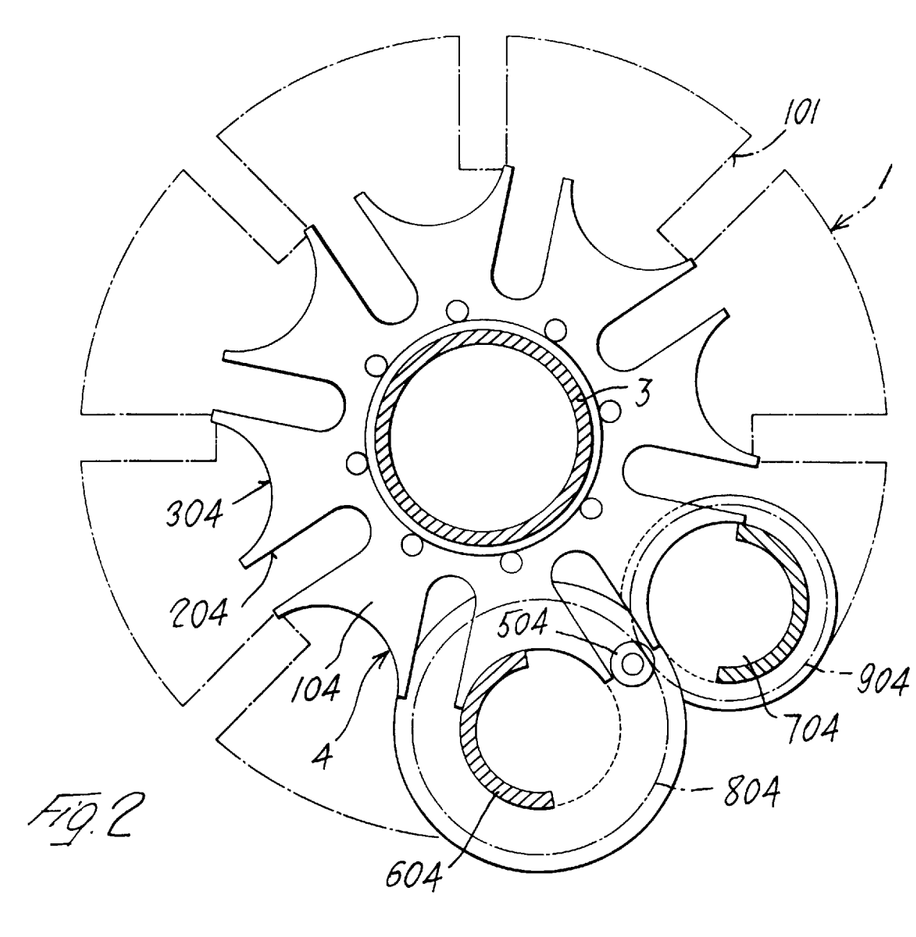
FIG. 2 is a schematic axial view of the Maltese cross transmission.

With reference to FIGS. 1 and 2, a conveyor device, particularly a conveyor wheel of a packing machine, for the transport of ordered groups of cigarettes, which may or may not be wrapped in a first foil wrapping, from one to another of a plurality of successive stations for folding the packaging slips or precut blank comprises two discs 1, 1'. The two discs 1, 1' are mounted so that they are freely rotatable at a certain distance from each other and coaxially with each other on the facing ends of two coaxial axles 2, 2'. As shown in FIG. 2, each disc has a plurality of radial recesses 101 which are distributed at predetermined angular intervals along the periphery of the disc and which form supporting cradles for the corresponding end areas of the cigarettes combined into ordered groups. The recesses 101 of the two adjacent discs 1, 1' are disposed so that they coincide axially and are shaped to match the profile of the corresponding transverse section of the ordered groups, in other words of the packet. The distance between the two discs 1, 1' must therefore be slightly smaller than the length of the cigarettes, particularly by an amount such that the ends of the cigarettes project beyond the outer sides of the two discs 1, 1' in order to permit the operations of folding the corresponding flaps of the slips and/or precut blanks.

Each disc 1, 1' is fixed on one end of a tubular shaft 3, 3' which is mounted rotatably on a corresponding axle 2, 2' and whose opposite end carries coaxially the Maltese cross plate 104, 104' of a Maltese cross transmission device 4, 4'. The said cross plate 4, 4' has a plurality of radial slots 204 between which are interposed peripheral portions 304 in the form of sectors, the angular disposition of the slots 204 being made to correspond to the steps of advance specified for the discs 1, 1', and in this case the number of radial slots 204 is equal to that of the recesses 101 of the discs 1, 1', with the same angular distribution as the recesses.

The Maltese cross plate 104, 104' of each disc 1, 1' interacts with an associated crank 404, 404' which carries a drive pin 504 designed to engage with the slots 204 on each rotation of the crank 404, 404', while a check drum 604 is provided coaxially with each crank 404, 404' and interacts with the peripheral sectors 304 between the slots.

Since the two discs 1, 1' must rotate in perfect synchronization, with a constantly maintained precise alignment of the coinciding recesses 101, in order to eliminate play in positioning during the static phases between the steps of rotation of the discs, each cross plate 104, 104' is associated with a second check drum 704 which interacts with the peripheral sector 304 directly adjacent to that interacting with the first check drum 604 and which is driven in a direction of rotation opposite that of the first check drum 604. In this way, each disc 1, 1' is held in a stable static position with the Maltese cross plate 104, 104' subjected to two opposing forces produced by the two contra-rotating check drums 604, 704.

Advantageously, each check drum 604, 704 may be associated with a coaxial gear 804, 904, these gears being engaged with each other, and the second check drum 704 being made to rotate by the first drum 604.

With reference to FIG. 1, the first check drum 604 and the coaxial crank 404 associated with one of the two discs 1 are mounted on the end of a shaft section 5 which is rotated by a driving shaft 6 through gears 7 and 8. Simultaneously, the driving shaft 6 drives directly, through the gears 7', 8', the shaft section 5' which rotates integrally with the first check drum 604 and the coaxial crank 404' of the Maltese cross device 4' associated with the other disc 1'. From the constructional point of view this may be done particularly conveniently by making the two shaft sections 5, 5' for the cranks 404, 404' and their associated check drums 604 of the two Maltese cross devices 4, 4' aligned coaxially with each other. In this case, the driving shaft 6 may be made with a length such that it extends parallel to and underneath both the shaft sections 5, 5'.

By this arrangement, a perfectly synchronized drive of the two discs 1, 1' is ensured, thus simulating the behaviour of a wheel in which the discs are physically connected to each other.

The driving shaft 6 may be connected dynamically to a motor, or by means of a mechanical system of transmission of motion to a main motor of the machine which also drives further operating units which are not illustrated.

Figure 6:
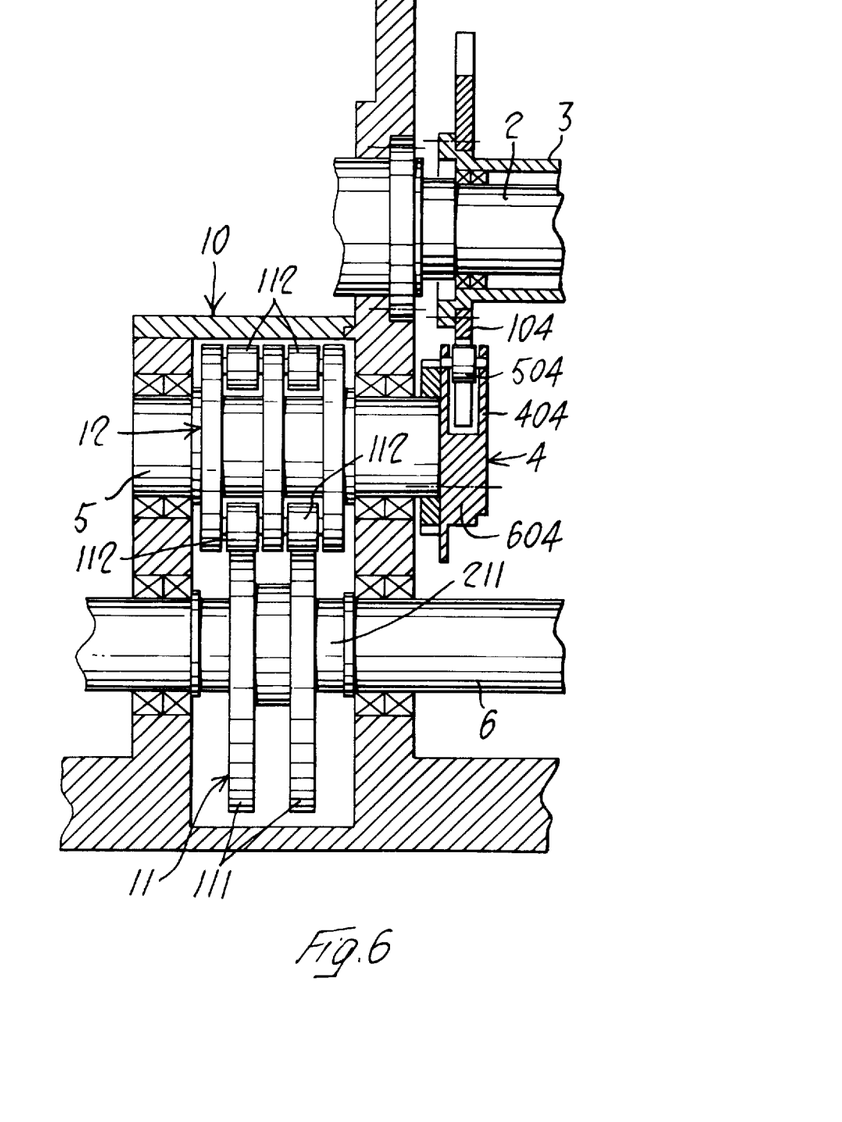
FIG. 6 shows a variant embodiment of the means of transmission and conversion of the motion.

According to a variant embodiment shown in FIG. 6, the dynamic connection between the driving shaft 6 and the shaft section 5, 5' which carries the cranks 404, 404' driving the Maltese cross 104, 104' and the associated check drum 604 may be provided by means of what is known as an intermittent drive device with parallel axes indicated in a general way by the number 10, for example one of the type marketed by the Colombo Filippetti Company, a group 11 of driving cams 111 being carried on a hollow shaft 211 fixed coaxially on and rotating integrally with the driving shaft 6, and an interacting unit 12 carrying rollers 112 being fixed coaxially on the shaft section 5, 5'. This makes it possible to compensate for the different speeds of the crank pin 504 due to the different radial and tangential components at the Maltese cross 104, 104' during the phases of engagement in the slots 204 and driving, and also to provide a higher rotation speed of the crank 404, 404' in the path in which the crank pin 504 does not interact with the cross plate 104, 104'. When the crank pin 504 engages with the slot 204 of the cross plate 104, 104', the crank and the pin already have the predetermined optimal speed. A further advantage consists in the fact that the component of the inertial mass which produces the acceleration and deceleration of the alternating motion of the discs and which is due to the driving and transmission means is further reduced by the intermittent drive device 10. Finally, the intermittent drive device makes it possible to separate the motion of the driving shaft 6 from the fixed law of transmission and conversion into alternating motion of the Maltese cross devices 4, 4'. This law of advance of the discs 1, 1' may be varied with respect to the motion of the main motor by varying the law of transmission of the intermittent drive device.

According to a further variant embodiment, the two discs 1, 1', and therefore the Maltese cross devices 4, 4' for transmission and conversion of motion, may be driven by separate motors. The motors may be synchronized by electronic means and any error of synchronization is compensated or eliminated by the particular Maltese cross transmission 4, 4'.

Figure 3:
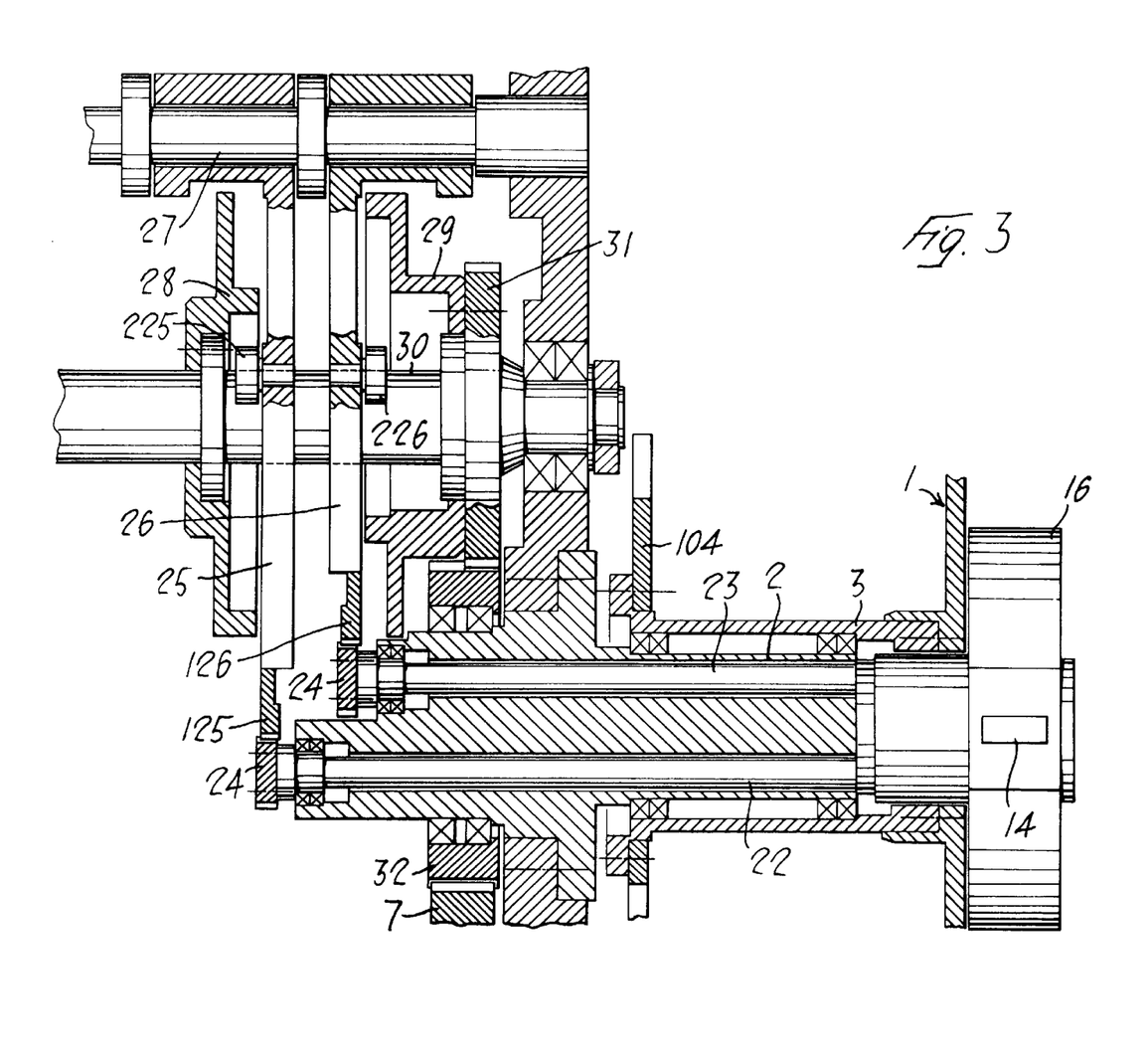
FIG. 3 is an axial section of the supporting axle of one part of the conveyor wheel, in which are housed the driving shafts of the pushing and guide means and means of driving the said shafts.
Figure 4:
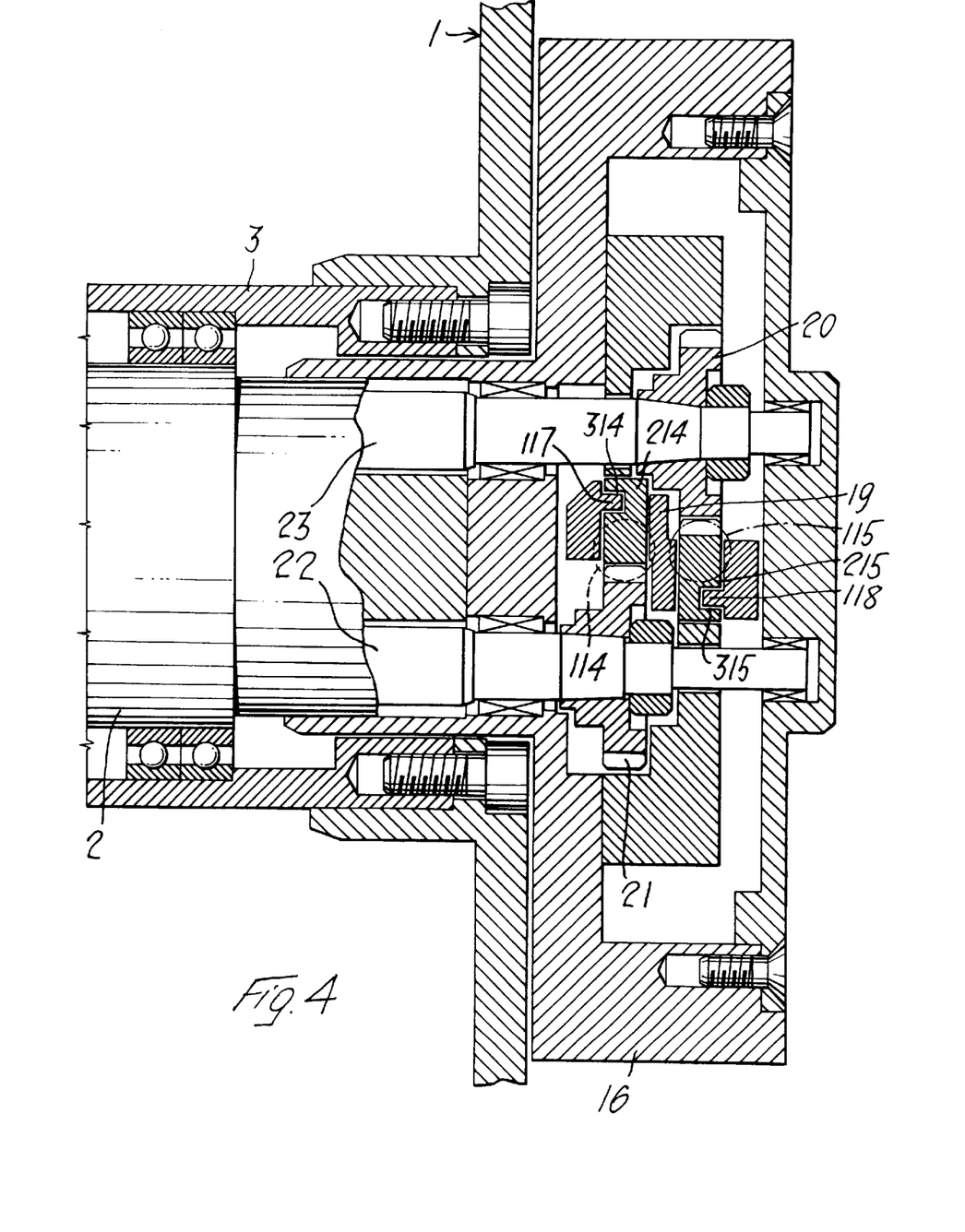
FIG. 4 is an enlarged section of the supporting and guiding box with the pushing and guide means.
Figure 5:
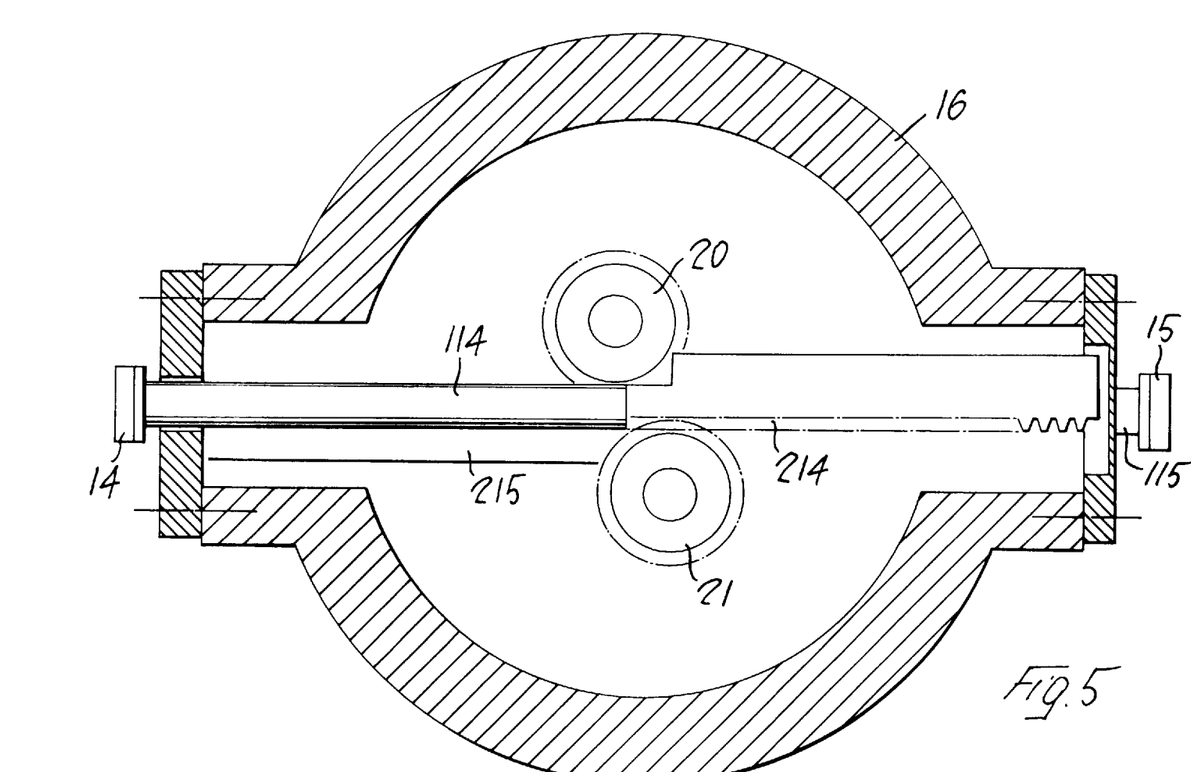
FIG. 5 is a transverse section of the box shown in FIG. 4.

As is shown in FIGS. 1, 3 and 4, the particular construction of the conveyor wheel as shown in the above figures makes it possible to construct in a particularly advantageous way the pushing and guide devices for the expulsion of the groups of cigarettes from, and their feeding into, the cells formed by the cradles 101. The said construction of the conveyor wheel eliminates the presence of axial elements interconnecting the two discs 1, 1'. The pushing and guide devices may therefore be made in the form of bars slidable in the radial direction of the discs 1, 1'. As well as eliminating problems of synchronization of the movements of the pushers and guides with the steps of advance of the conveyor wheel, the total absence of axial elements interconnecting the two discs 1, 1' also makes it possible to execute the operating movements of the said pushers and guides at lower speeds and to have the end-of-return-travel positions directly radially behind the radially inner sides of the groups of cigarettes, in other words of the cells formed by the recesses 101. In this way, the movements of the said pushers and guides may also be considerably shortened.

The example shown in FIGS. 1, 3 and 4 has an expelling pusher 14 and a feed guide 15 which execute a movement along a horizontal diametrical axis of the wheel formed by the discs 1, 1', in the opposite direction to each other. The pusher 14 and the guide 15 each consist of a bar 114, 115 which terminates at the rear in a rack 214, 215 parallel to the bar 114, 115. The bars 114 and 115 and the racks 214, 215 are disposed adjacent and parallel to each other in the axial direction of the conveyor wheel and with their longitudinal axes intersecting the axis of the wheel. The pusher 14 and the guide 15 are housed in a casing 16 which is placed in an intermediate position between the two discs 1, 1' and between the two ends of the opposing supporting axles 2, 2' of the discs, these axles terminating with their facing ends also spaced apart. The two racks 214, 215 are engaged in longitudinal sliding guides. In particular, each rack 214, 215 has, in the area opposite the teeth, a lateral longitudinal slot 314, 315 in which is engaged a lateral rib 117, 118 of a lateral guide. The lateral guides interact with the outer sides of the two adjacent racks, while the facing sides of the racks are guided by a single intermediate separating wall 19. The racks 214, 215 have their teeth along the outer longitudinal edges, in other words one along the lower edge and the other along the upper edge, and interacting with pinions 20, 21 provided on opposite sides of them and located at the ends of shafts 22 and 23 respectively. The shafts 22, 23 extend axially inside one of the two axles 2, which is made suitably tubular, and their other ends, on which gears 24 are fixed, project outside the axle. The two shafts 22, 23 are of different lengths, and therefore the ends provided with the gears 24 terminate at different distances and interact with sector gears 125, 126 of two oscillating arms 25, 26 which are orientated radially with respect to the shafts 22, 23. The arms 25, 26 are pivoted so that their ends opposite the sector gears 125, 126 oscillate freely on a single axle 27, while in their intermediate area they each carry a roller 225, 226 which interacts with an associated barrel cam 28, 29. The barrel cams 28, 29 are shaped suitably so that they can be driven by a single shaft 30, in order to obtain the synchronization of the driving movements specified for the pusher 14 and for the guide 15 with the motion of the conveyor wheel. The drive of the shaft 30 is taken through a transmission train, of which only some gears 31, 32 are indicated, from the driving motion of the conveyor wheel. As shown in FIG. 3, in the inactive position of complete withdrawal of the pusher 14 and of the guide 15 these are disposed directly radially behind the base walls of the recesses 101 in the discs 1, 1'.

I claim:

1. A conveyor device for conveying groups of circular objects in a circular path comprising:

a wheel rotated about an axis thereof in steps of predetermined angular size, said wheel including respective first and second parallel discs which are axially separated from one another on either side of an intermediate plane perpendicular to the axis and which are free of any intermediate connection in a space axially therebetween;

respective first and second shafts on which the respective said first and second discs are mounted for rotation, said first and second shafts being coaxial so that said first and second discs rotate coaxially;

a driving means for connecting said first and second shafts together dynamically and for driving said first and second shafts in phase and synchronization with one another by a common motor in the steps of predetermined angular size; and a plurality of cells provided in a periphery of said wheel for housing respective groups, each said cell being formed by peripheral recesses on each of said first and second discs with said recesses for each said cell being axially aligned.

2. A conveyor device as claimed in claim 1:

wherein said first and second discs are separated axially by a distance which slightly less than a length of the objects of the group; and wherein said recesses are formed by cutouts in each said disc and support respective sides of said groups.

3. A conveyor device as claimed in claim 1:

wherein said driving means includes separate first and second transmission means for respectively converting a continuous rotary motion of the motor to the step of predetermined angular size for the respective said first and second shafts.

4. A conveyor device as claimed in claim 3:

wherein said first and second transmission means each include a Maltese cross plate mounted coaxially with a respective said disc for integral rotation therewith, said cross plate having a number of radial slots equal to a number of said recesses in the respective said disc and having a same angular distribution as said recesses of the respective said disc.

5. A conveyor device as claimed in claim 4:

wherein each respective said cross plate includes a plurality of peripheral sectors disposed in an angular distribution thereabout and separated by respective said radial slots; and wherein each respective said transmission means further includes
   an associated crank which rotates, and
   a coaxial first check drum which rotates integrally with said crank whereby said first check drum interacts with an adjacent said peripheral sector of an associated said cross plate between the steps of predetermined angular size.

6. A conveyor device as claimed in claim 5:

wherein each respective said transmission means further includes a crank pin connected to an associated said crank which engages successive radial slots of the associated said cross plate as the associated said crank rotates to move the associated said cross plate in the steps of predetermined angular size, and a second check drum which rotates opposite to said first check drum and which interacts between the steps of predetermined angular size with an adjacent said peripheral sector which is located circumferentially adjacent to said peripheral sector interacting with said first check drum.

7. A conveyor device as claimed in claim 6:

wherein each respective said transmission means further includes a first gear rotating coaxial with said first check drum and a second gear rotating coaxially with said second check drum, said first and second gears engaging one another so that said second check drum is rotated by movement of said first check drum.

8. A conveyor device as claimed in claim 7:

wherein respective said cranks of said first and second transmission means are disposed coaxially with axes parallel to the axis of said wheel, wherein respective said first check drums of said first and second transmission means are disposed coaxially with axes parallel to the axis of said wheel, and wherein respective said second check drums of said first and second transmission means are disposed coaxially with axes parallel to the axis of said wheel; and wherein said driving means includes a main driving shaft extending parallel to the axis of said wheel which drives said first and second transmission means in synchronization with one another and in phase.

9. A conveyor device as claimed in claim 8:

wherein each respective said transmission means further includes a gear train which is driven by said main driving shaft for rotating the associated said crank.

10. A conveyor device as claimed in claim 8:

wherein each respective said transmission means further includes a means for intermittently driving the associated said crank with said main driving shaft.

11. A conveyor device as claimed in claim 1:

wherein said first and second shafts have facing ends which are separated axially from one another by a distance about the same as a distance separating said first and second discs such that there is a central space between said first and second discs and facing ends of said first and second shafts.

12. A conveyor device as claimed in claim 11:

further including a guide/pusher means located in the central space and radially inside of said cells for radially transferring of the groups into said cells and subsequently for radially expelling of the groups from said cells.

13. A conveyor device as claimed in claim 12:

wherein each said cell includes a radially inner base end; and wherein said guide/pusher means includes a guide member which is radially movable between an active position where said guide member guides a group into an adjacent said cell and an inactive position located a short distance radially inward from said base end of the adjacent said cell, and a pusher member which is radially movable between an active position where said pusher member pushes a group in a selected said cell from the selected said cell and an inactive position located a short distance radially inward from said base end of the selected said cell.

14. A conveyor device as claimed in claim 13:

wherein one of said first and second shafts is tubular; and wherein said guide/pusher means further includes a casing provided in said central space between said first and second shafts and from which said guide member and said pusher member extend in opposite radial directions, a guide rack end of said guide member and a pusher rack end of said pusher member located in said casing, a guide means in said casing for guiding of said guide rack end and said pusher rack end for radial movement, a guide pinion and a pusher pinion which respectively engage said guide rack end and said pusher rack end, and a guide shaft and a pusher shaft disposed in and parallel to said tubular one of said first and second shafts, said guide shaft and said pusher shaft being respectively connected to said guide pinion and said pusher pinion for providing respective rotation of said guide pinion and said pusher pinion.

15. A conveyor device as claimed in claim 14:

wherein said guide/pusher means further includes a guide gear and a pusher gear provided at respective ends of said guide shaft and said pusher shaft, which said ends are located opposite said casing and outside of said tubular one of said first and second shafts, said guide gear and said pusher gear being axially separated from one another, an arm axle parallel to said tubular one of said first and second shafts, a guide arm and a pusher arm mounted at respective proximal ends thereof to said arm axle for oscillation thereon, said guide arm and said pusher arm respectively including (a) a guide sector gear and a pusher sector gear at respective distal ends of the respective said guide arm and pusher arm which interact respectively with said guide gear and said pusher gear, and (b) a guide roller and a pusher roller mounted intermediate the respective said guide arm and pusher arm, said guide roller and said pusher roller being rotatable about respective axes transverse to the respective said guide arm and pusher arm, a guide cam and a pusher cam which interact respectively with said guide roller and said pusher roller to selectively move the respective said guide member and said pusher member between said active and inactive positions thereof.

16. A conveyor device as claimed in claim 15:

wherein said guide member and said pusher member are axially adjacent one another and extend in opposite parallel directions.

* * * * *